United States Patent
Smith et al.

(10) Patent No.: US 8,799,404 B2
(45) Date of Patent: Aug. 5, 2014

(54) WEATHER ANALYTICS SYSTEMS AND METHODS

(75) Inventors: Kevin G. Smith, Lehi, UT (US); William Brandon George, Pleasant Grove, UT (US); Pearce Aurigemma, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 180 days.

(21) Appl. No.: 13/116,213

(22) Filed: May 26, 2011

(65) Prior Publication Data

US 2014/0012941 A1    Jan. 9, 2014

(51) Int. Cl.
*G06F 15/16*    (2006.01)

(52) U.S. Cl.
USPC .......................................................... 709/217

(58) Field of Classification Search
None
See application file for complete search history.

(56) References Cited

U.S. PATENT DOCUMENTS

| | | | | |
|---|---|---|---|---|
| 5,521,813 A * | 5/1996 | Fox et al. | | 705/7.29 |
| 6,584,447 B1 * | 6/2003 | Fox et al. | | 705/7.31 |
| 6,820,116 B1 * | 11/2004 | Pyhalammi et al. | | 709/219 |
| 6,985,933 B1 * | 1/2006 | Singhal et al. | | 709/219 |
| 7,069,232 B1 * | 6/2006 | Fox et al. | | 705/7.31 |
| 7,080,018 B1 * | 7/2006 | Fox et al. | | 705/14.5 |
| 8,032,302 B1 * | 10/2011 | Agronow | | 702/3 |
| 2002/0133385 A1 * | 9/2002 | Fox et al. | | 705/7 |
| 2003/0149745 A1 * | 8/2003 | Dunay et al. | | 709/217 |
| 2005/0096947 A1 * | 5/2005 | Fox et al. | | 705/7 |
| 2005/0102104 A1 * | 5/2005 | Parsons | | 702/3 |
| 2006/0075019 A1 * | 4/2006 | Donovan et al. | | 709/203 |
| 2006/0277308 A1 * | 12/2006 | Morse et al. | | 709/227 |
| 2007/0280229 A1 * | 12/2007 | Kenney | | 370/389 |
| 2009/0234717 A1 * | 9/2009 | Wiggins et al. | | 705/10 |
| 2011/0119226 A1 * | 5/2011 | Ruhl et al. | | 706/52 |
| 2012/0054302 A1 * | 3/2012 | Priyadarshan et al. | | 709/217 |
| 2012/0095834 A1 * | 4/2012 | Doig et al. | | 705/14.53 |
| 2012/0147030 A1 * | 6/2012 | Hankers et al. | | 345/619 |
| 2013/0013545 A1 * | 1/2013 | Agarwal et al. | | 706/46 |

* cited by examiner

*Primary Examiner* — Otis L Thompson, Jr.
*Assistant Examiner* — Jael Ulysse
(74) *Attorney, Agent, or Firm* — Kilpatrick Townsend & Stockton LLP

(57) ABSTRACT

Provided is a method for providing content. The method includes receiving, from a client computer system, a request for content to be provided to a user, determining a geographic location of the user, obtaining weather information corresponding to the geographic location of the user, identifying content to be provide in response to the request based at least in part on the weather information corresponding to the geographic location of the user, and providing, to the client computer system, the identified content.

18 Claims, 5 Drawing Sheets

WEATHER ANALYTICS SYSTEMS AND METHODS

BACKGROUND

Website providers often collect data that describes usage and visitation patterns for their websites. For example, website providers often collect information about how a visitor navigates through their website. This information is often referred to as web analytics data. Such information can be extremely valuable in developing usage statistics for various purposes, including, for example, estimating server load, determining advertising rates, identifying areas of websites that are in need of redesign, and the like.

Web analytics data is often collected via logfile analysis or page tagging. Logfile analysis includes reading logfiles that store a web server's transactions. Page tagging uses executable code (e.g., a "web-bug") embedded in the webpage to transmit information about the user and their website visit when the webpage is executed by the visitor's browser application. Web analytics data is often gathered and stored at a web analytics provider to generate a database of web analytics data. Web analytics data may be processed to generate various web analytics reports that can be used by a website administrator to assess and optimize their website. For example, a website provider may submit a query to a web analytics provider for a metric identifying what percentage of visitors to their website are making purchases on the website, and the web analytics provider may process the stored data to provide the corresponding metric.

A website provider will sometimes employ analytics data and associated metrics to provide content targeted to the anticipated audience. In some instances, a website provider will attempt to learn about profiles (e.g., demographics) of visitors, and provide corresponding content of that is expected to interest the visitor. For example, an advertisement for a sports drink may be provided on a webpage displayed to a user that has a history of visiting sports related websites. The more a site provider can learn and understands about a visitor's profile, the better the site provider can control the content delivered to website visitors, thereby improving the visitor's experience and improving the site's overall effectiveness. In some instances, site providers gather user profile information from the user directly (e.g., asking the user for profile information), from data gathered during user browser sessions (e.g., web analytics data), and so forth. Although these techniques provide information that can be useful in assessing user profiles and related decisions, certain limitations may still exist. For example, where the profile information is limited to a user's age and gender, decisions may be based on the limited information relating to the visitor's age and gender.

Accordingly, it may be useful to expand the techniques for gathering and correlating the information to increase the effectiveness of providing content to website visitors.

SUMMARY

Various embodiments of methods and apparatus for correlating weather information with user activity and employing the correlations as a basis for providing content to users (e.g., website visitors) are provided. In some embodiments, provided is a method for providing content. The method includes receiving, from a client computer system, a request for content to be provided to a user, determining a geographic location of the user, obtaining weather information corresponding to the geographic location of the user, identifying content to be provide in response to the request based at least in part on the weather information corresponding to the geographic location of the user, and providing, to the client computer system, the identified content.

In some embodiments, provided is a non-transitory computer readable storage medium storing computer-executable program instructions that when executed by a computer are configured to cause: receiving a request for content to be provided to a user, determining a geographic location of the user, obtaining weather information corresponding to the geographic location of the user, identifying content to be provide in response to the request based at least in part on the weather information corresponding to the geographic location of the user, and providing the identified content.

In some embodiments, provided is a system including a processor and a weather processing module executable by the processor to: receive, from a client computer, a request for content to be provided to a user, determine a geographic location of the user, obtain weather information corresponding to the geographic location of the user, identify content to be provide in response to the request based at least in part on the weather information corresponding to the geographic location of the user, and provide, to the client computer system, the identified content.

In some embodiments, provided is a method of identifying a correlation of user activity to weather conditions. The method includes receiving, by an analytics server, analytics data indicative of a plurality of instances of user activity at a content site, identifying, for each of the plurality of instances of user activity at the content site: a location indicative of a location of a user at or near the time of the user activity, and a weather condition corresponding to the locations identified at or near a time of the instance of user activity at content site, identifying a weather correlation indicative of an impact of weather conditions on user activity based at least in part on the plurality of instances of user activity at a content site and corresponding weather conditions identified, and storing the weather correlation.

In some embodiments, provided is a method of influencing content site behavior. The method includes identifying a weather correlation indicative of an impact of weather conditions on user activity based at least in part on the plurality of instances of user activity at a content site and corresponding weather conditions identified, determining, based at least in part on the weather correlation, one or more actions to be employed to influence behavior of a content site, and storing a record indicative of the one or more actions.

Figure 1:
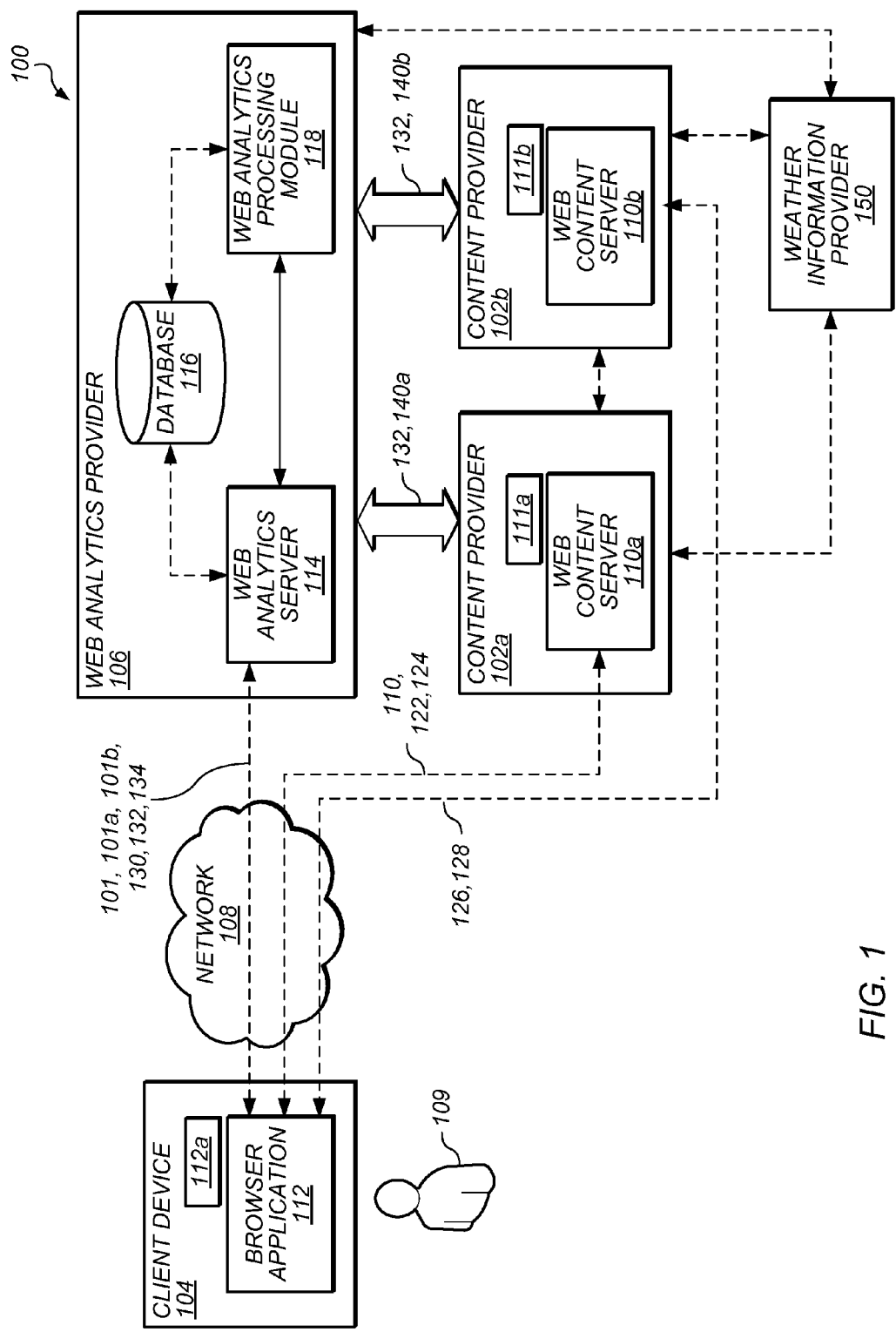
FIG. 1 as a block diagram that illustrates an exemplary web analytics system in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As described in more detail below, provided in some embodiments are systems and methods for obtaining weather information, correlating weather information with user behavior, and providing selected content to site visitors based on weather conditions and/or the correlations. In some embodiments, web analytics data is accumulated that includes information regarding user activity (e.g., website visit information) and associated weather information. In certain embodiments, for example, web analytics data collected may include information regarding a user's interaction with a website (e.g., number of clicks, number of products ordered, total revenue generated, and so forth) and weather information corresponding to the website visit (e.g., weather conditions at the user's location at or near the time of the website). In some embodiments, the web analytics data regarding user activity and the corresponding weather (e.g., activity/weather analytics data) may be used to assess and determine whether correlations exists between the weather and user activity and, if so, to what extent. In certain embodiments, for example, assessment of the activity/weather data may reveal a correlation that certain user activities (e.g., movie rentals) are significantly higher during some weather conditions (e.g., "rainy" and "snowy" weather conditions), and are significantly lower in other weather conditions (e.g., "sunny", "cold" and "cloudy" conditions). In some embodiments, however, assessment of the activity/weather data may reveal no significant correlation between the sales of certain products (e.g., books) and the weather. In some embodiments, collecting and assessing data for weather and activity may reveal expected correlations (e.g., umbrella sales increase in rainy conditions), as well as unexpected correlations (e.g., sales of socks increase in high humidity conditions). In certain embodiments, the activity/weather analytics data and/or corresponding correlations may be used as a basis for serving selected content to users. For example, advertisements for movie rentals, warm weather vacations, and the like could be provided when it is identified that the user is experiencing rainy and/or cold conditions. Similarly, advertisements for shade products could be provided when it is identified that the user is experiencing hot and/or sunny conditions.

In some embodiments, content is provided to users based on user activity and/or weather conditions. In certain embodiments, for example, in response to receiving a user request for content (e.g., a webpage request), a content provider (e.g., website provider) may obtain location information indicative of a geographical location of the user, obtain weather information corresponding to the geographic location of the user, identify content to be provide in response to the request based on the weather information corresponding to the geographic location of the user (e.g., based on a correlation of activity/ weather analytics data), and provide the identified content to the user. In some embodiments, for example, a particular version of a webpage and/or a particular web page advertisement (e.g., promotion for a movie rental) may be provided that corresponds to the weather conditions (e.g., rainy conditions) at the geographic location of the user. In certain embodiments, the content provider may query a weather information service to obtain the weather information corresponding to the geographic location of the user. In some embodiments, weather information for a location may be stored (e.g., cached) for a given period of time such that future queries relating to weather at the location may be satisfied by simply retrieving the stored weather information.

In some embodiments, other decisions may be based on the obtained weather information. In certain embodiments, for example, bidding for keywords/phrases offered by search engines may be manipulated based on the weather in certain locations. In some embodiments, bid amounts for a keyword/ phrase (e.g., "movie rental") in a geographic location may be increased when it is determined that the area is experiencing a given type of weather (e.g., "rainy" weather), and may be decreased when it is determined that the area is experiencing another type of weather (e.g., "sunny" weather).

FIG. 1 as a block diagram that illustrates an exemplary web analytics system 100 in accordance with one or more embodiments of the present technique. System 100 may be employed to accumulate and process analytics data 101, and/or to provide content based at least in part on weather information corresponding to the geographic location of the user. In some embodiments, information relating to weather and/or user activity may be obtained via web analytics system 100.

In the illustrated embodiment, system 100 includes content providers 102a and 102b, a client device 104 and a web analytics provider 106. Each of content providers 102a and 102b, client device 104 and web analytics provider 106 may be communicatively coupled to one another via a network 108.

Network 108 may include a channel for providing effective communication between each of the entities of system 100. In some embodiments, network 108 includes an electronic communication network, such as the internet, a local area network (LAN), a cellular communications network, or the like. Network 108 may include a single network or combination of networks that facilitate communication between each of the entities (e.g., between content providers 102a and 102b, client 104 and web analytics provider 106) of system 100.

During use, a user 109 may employ client device 104 to retrieve content from content providers 102a and/or 102b via network 108. Client device 104 may transmit corresponding analytics data 101 to web analytics provider 106 via network 108. Analytics data 101 may include activity information indicative of user behavior and/or location information indicative of a geographic location of the user 109. Web analytics provider 106 and/or content providers 102a and/or 102b may assess the received analytics data 101 to obtain weather information corresponding to the weather at the geographic location. For example, the analytics provider 106 and/or content providers 102a and/or 102b may query a weather information provider for weather conditions at the geographic location at or near the time of the website visit and may correlate the weather information with the activity information. Overtime, web analytics provider 106 may collect an increasing amount of web analytics data, and may provide similar assessments of the received analytics data to correlate weather information with the activity information for a plurality of website visits. As described herein, with regard to at least method 200 of FIG. 2, tracking the relationship between weather and user behavior may enable a plurality of correlations to be identified. For example, correlations may indicate that movie rentals may increase on "rainy" or "snowy" days and may decrease on "sunny" days. As described herein with regard to at least method 400 of FIG. 4, weather data associated with a user request for content may enable a content provider to serve targeted content based at least on weather conditions at the geographic location of a user generating the request. In some embodiments, the determination of what content to serve may be based on correlations of past activity and weather information, such as that generated as a result of techniques describe with regard to at least method 200 of FIG. 2.

Content providers 102a and/or 102b may include source of information/content (e.g., a Hyper Text Markup Language (HTML) file defining display information for a webpage) that is provided to client device 104. For example content providers 102a and/or 102b may include vendor websites used to present retail merchandise to a consumer. In some embodiments, content providers 102a and 102b may include respective web content servers 110a and 110b. Web content servers 110a and 110b may include web content 110 stored thereon, such as HTML files that are accessed and loaded by client 104 for viewing webpages of content providers 102a and 102b. In some embodiments, content providers 102a and 102b may serve client device 104 directly. For example, content 110 may be provided from each of servers 110a or 110b directly to client 104. In some embodiments, one of content providers 102a and 102b may act as a proxy for the other of content providers 102a and 102b. For example, server 110a may relay content from server 110b to client device 104.

In the illustrated embodiment, content providers 102a and/or 102b include content processing modules 111a and/or 111b, respectively. Processing modules 111a or 110b may be provided on content servers 110a or 110b. Processing modules 111a and/or 111b may include computer executable code (e.g., executable software modules), stored on a computer readable storage medium that is executable by a computer to provide associated processing. For example, processing modules 111a or 111b may process incoming request (e.g., for content) and/or analytics data provided by web analytics provider 106 to generate corresponding responses to request (e.g., content). Content processing modules 111a and/or 11b may include the weather processing modules for acquiring activity/location/weather data, correlating activity/location/weather data and/or employing the resulting correlations. For example, processing module 111a and 111b may identify a weather correlation, receive a request for content, determine a location associated with the request, obtain weather information corresponding to the location, identify content based on the weather information, and provide the identified content, as depicted and described in more detail below with regard to at least method 400 of FIG. 4.

Client device 104 may include a computer or similar device used to interact with content providers 102a and 102b. In some embodiments, client device 104 includes a wireless device employed by user 109 to access content (e.g., web pages of a websites) of content providers 102a and 102b via network 108. For example, client device 104 may include a personal computer, a cellular phone, a personal digital assistant (PDA), or the like. In some embodiments, client device 104 may include an application (e.g., internet web browser application) 112 that can be used to generate a request for content, to render content, and to communicate request to various devices on the network. For example, upon selection of a website link on a webpage displayed to user 109 by browser application 112, browser application 112 may submit a request for the corresponding webpage/content to web content server 110a, and web content server 110a may provide corresponding content 110 (e.g., a corresponding HTML file) that is executed by browser application 112 to render the requested website for display to user 109. In some instances, execution of the HTML file may cause browser application 112 to generate additional request for additional content (e.g., an image referenced in the HTML file as discussed below) from a remote location, such as content providers 102a and 102b and/or web analytics provider 106. The resulting webpage 112a may be viewed by a user via a video monitor or similar graphical display device at client 104.

In some embodiments, client device 104 may be capable of generating location information. For example, where client device 104 comprises a cellular phone with an integrated global positioning (GPS) device, the cellular phone may be capable of determining and/or forwarding location information, including geographic coordinates of the cellular phone embedded within analytics data 101. Where client device 104 comprises a computing device having an internet protocol (IP) address on a network, client device may be capable of determining and/or forwarding location information, including an IP address of the computing device embedded within analytics data 101. In some embodiments, client device may be capable of determining and/or forwarding location information in response to an HTML 5 query.

Web analytics provider 106 may include a system for the collection and processing of web analytics data 101, as well as the generation of corresponding web analytics reports including various metrics of the web analytics data (e.g., a promotion effectiveness index and/or a promotion effectiveness ranking). Web analytics data may include data that describes usage and visitation patterns for websites and/or individual webpages within the website. Web analytics data may include information relating to the activity and interactions of one or more users with a given website or webpage. For example, web analytics data may include historic and/or current website browsing information for one or more website visitors, including, but not limited to identification of links selected, identification of web pages viewed, identification of conversions (e.g., desired actions taken—such as the purchase of an item), number of purchases, value of purchases, and other data that may help gauge user interactions with webpages/websites.

In some embodiments, web analytics data 101 includes information indicative of a location. For example web analytics data 101 may include location data (e.g., geographic coordinates—latitude and longitude) indicative of a geographic location of user 109 and/or client device 104. For example, received web analytics data 101 may include information regarding a user's website visit (e.g., activity data 101a) and corresponding information (e.g., location data 101b) indicative of a location of user 109 and/or client device 104 at the time of the website visit. Thus, in some embodiments, web analytics data 101 can be used to assess a user's activity and the corresponding location of those activities. In some embodiments, location information 101b includes geographic location information. For example, the location information may include an indication of the geographical coordinates (e.g., latitude and longitude), IP address or the like or a user 109 or client device 104 at or near the time of the website visit.

In some embodiments, web analytics data 101 is accumulated over time to generate a set of web analytics data (e.g., a web analytics dataset) that is representative of activity and interactions of one or more users with a given website or webpage. For example, a web analytics dataset may include analytics data associated with all user visits to a given website. A corresponding web analytics data subset may include analytics data associated with all user visits to the website within a given time period. Web analytics datasets may be processed to generate metric values that are indicative of a particular trait or characteristic of the data (e.g., a number of website visits, a number of items purchased, value of items purchased, a conversion rate, a promotion effectiveness index, etc.).

Web analytics provider 106 may include a third-party website traffic statistic service. Web analytics provider 106 may include an entity that is physically separate from content providers 102a and 102b. Web analytics provider 106 may reside on a different network location from content providers 102a and 102b and/or client device 104. In the illustrated embodiment, for example, web analytics provider 106 is communicatively coupled to client device 104 via network 108. Web analytics provider 106 may be communicatively coupled to content providers 102a and 102b via network 108. Web analytics provider 106 may receive web analytics data 101 from client device 104 via network 108 and may provide corresponding web analytics data (e.g., web analytics reports) and/or correlation information to content provider 102a and 102b via network 108 or some other form of communication.

In the illustrated embodiment, web analytics provider 106 includes a web analytics server 114, a web analytics database 116, and a web analytics processing module 118. Processing module 118 may include computer executable code (e.g., executable software modules, stored on a computer readable storage medium that is executable by a computer to provide associated processing. For example, processing module may process web analytics datasets stored in database 116 to generate corresponding web analytics reports that are provided to content providers 102a and 102b. Web analytics processing module 118 may include the weather processing module for acquiring activity/location/weather data, correlating activity/location/weather data and/or employing the resulting correlations. For example web analytics processing module 118 may obtain analytics data, determine one or more locations associated with the analytics data, obtain weather information corresponding to the one or more locations, identify one or more correlations of weather to activity, and/or provide for managing a content site based on the one or more correlation as depicted and described in more detail below with regard to at least method 200 of FIG. 2.

Web analytics server 114 may service requests from one or more clients. For example, upon loading/rendering of a webpage 112a by browser 112 of client device 104, browser 112 may generate a request to web analytics server 114 via network 108. Web analytics server 114 and/or processing module 118 may process the request and return appropriate content (e.g., an image) to browser 112 of client device 104. In some embodiments, the request includes a request for an image, and web analytics provider 106 simply returns a single transparent pixel for display by browser 112 of client device 104, thereby fulfilling the request. The request itself may also include web analytics data embedded therein. Some embodiments may include content provider 102a and/or 102b embedding or otherwise providing a pointer to a resource, known as a "web bug", within the HTML code of the webpage 112a provided to client device 104. The resource may be invisible to user 109, such as a transparent one-pixel image for display in a web page. The pointer may direct browser 112 of client device 104 to request the resource from web analytics server 114. Web analytics server 114 may record the request and any additional information associated with the request (e.g., the date and time, and/or identifying information that may be encoded in the resource request).

In some embodiments, an image request embedded in the HTML code of the webpage provided may include codes/strings that are indicative of web analytics data, such as data about a user/client, the user's computer, the content of the webpage, or any other web analytics data that is accessible and of interest. A request for an image may include, for example, "image.gif/XXX . . ." wherein the string "XXX . . ." is indicative of the web analytics data. For example, the string "XXX" may include information regarding a website visit (e.g., activity data 101a) as well as location information (e.g., location data 101b) identifying a location of user 109 and/or client device 104 at or near the time of the website visit (e.g., at or near the time of the request). Web analytics provider 106 may parse the request (e.g., at server 114 or processing module 118) to extract the web analytics data 101 contained within the request. Web analytics data 101 may be stored in web analytics database 116, or a similar storage/memory device, in association with other accumulated web analytics data. In some embodiments, processing module 118 may receive/retrieve web analytics data from web analytics server 114 and/or database 116. Web analytics processing module 118 may process the web analytics data to generate one or more web analytics reports. For example, web analytics report module 118 may filter the raw web analytics data received at web analytics server 114 to generate concise and complete web analytics reports, as may be requested by a website administrator of one of content providers 102a and 102b. Reports, for example, may include overviews and statistical analyses describing the relative frequency with which various site paths are being followed through the content provider's website, the rate of converting a website visit to a purchase (e.g., conversion), relationships/correlations between weather and user activity, and so forth.

In some embodiments, user 109 interacts with client device 104 to execute a software application, such as browser application 112 of client device 104, for accessing and displaying one or more webpages 112a. In response to a user command, such as clicking on a link or typing in a uniform resource locator (URL), browser application 112 may issue a webpage request 122 to web content server 110a of content provider 102a via network 108 (e.g., via the Internet). In response to request 122, web content server 110a may transmit the corresponding content 110 (e.g., webpage HTML code 124 corresponding to webpage 112a) to browser application 112. Browser application 112 may interpret the received webpage code 124 to display the requested webpage 112a to user 109 at a user interface (e.g., monitor) of client device 106. Browser application 112 may generate additional requests for content from the servers, or other remote network locations, as needed. For example, if webpage code 124 calls for content, such as an advertisement, to be provided by content provider 102b, browser application 112 may issue an additional request 126 to web content server 110b. Web content server 110b may provide a corresponding response 128 containing requested content 110, thereby fulfilling the request. Browser application 112 may assemble the additional content for display within webpage 112a. In some embodiments, content 110 may be based on weather information corresponding to a geographic location of location user 109 and/or client device 104, as depicted and described in more detail below with regard to at least methods 200 and 400 of FIGS. 2 and 4, respectively.

In some embodiments, client device 104 transmits webpage visitation tracking information to web analytics provider 106. For example, as described above, webpage code 124 may include executable code (e.g., a web bug) to initiate a request for data from web analytics server 114 such that execution of webpage code 124 at browser 112 causes browser 112 to generate a corresponding request 130 for the data to web analytics server 114. In some embodiments, request 130 may itself have web analytics data (e.g., activity data and/or location data) 101 contained/embedded therein, or otherwise associated therewith, such that transmitting request 130 causes transmission of web analytics data 101 from client 104 to web analytics provider 106. For example, as described above, request 130 may include an image request having an embedded string of data indicative of web analytics data 101. Web analytics provider 106 may process (e.g., parse) request 130 to extract web analytics data 101 contained in, or associated with, request 130. In some embodiments, request 130 from client 104 may be forwarded from server 114 to database 116 for storage and/or to web analytics processing module 118 for processing. Web analytics processing module 118 and/or server 114 may process the received request to extract web analytics data 101 from request 130. Where request 130 includes a request for an image, web analytics server 114 may simply return content/image 134 (e.g., a single transparent pixel) to browser 112, thereby fulfilling request 130.

In some embodiments, web analytics server 106 may transmit web analytics data (e.g., activity data and/or location data) and/or a corresponding web analytics reports to content providers 102*a* and/or 102*b*, or other interested entities. For example, web analytics data 132 and/or web analytics reports 140*a* and 140*b* (e.g., including processed web analytics data) may be forwarded to site administrators of content providers 102*a* and 102*b* via network 108, or other forms of communication. In some embodiments, reports may include correlations of weather and activity data that can be used by a content provider to dynamically select/identify content to be provided in response to a request for content.

In some embodiments, a content provider may log-in to a website, or other network based application, hosted by web analytics provider 106, and may interact with the website/application to generate custom web analytics reports. For example, content provider 102*a* may log into a web analytics website via website server 114, and may interactively submit request 142 to generate reports for various metrics (e.g., number of conversions for male users that visit the home page of the content provider's website, activity/weather correlations, etc.), and web analytics provider 106 may return corresponding reports (e.g., reports dynamically generated via corresponding queries for data stored in database 116 and processing of the data via module 118). In some embodiments, content providers 102*a* and 102*b* may provide web analytics data to web analytics provider 106.

In some embodiments, system 100 may include weather information provider 150. Weather information provider 150 may include a source of weather data. For example, in response to receiving a query including a geographic location (e.g., zip code), weather information provider 150 may provide weather conditions (e.g., sunny, rainy, cold, cloudy, snowy, temperature, humidity, pollution levels, etc.) for the location (e.g., zip code). In some embodiments, weather information provider 150 is accessible by one or more entities of system 100 (e.g., via network 108). For example, analytics provider 106, content provider 102*a* and/or 102*b*, and or client device 104 may submit queries to weather information provider 150 for weather data. Weather information provider 150 may include a third-party source or weather information. In some embodiments, weather information provider 150 may include a website providing weather information. In some embodiments, a database of weather information is built based on data retrieved from weather information provider. For example, database 116 (or a database at content providers 102*a* and/or 102*b*) may be populated with weather data accessible by web analytics provider 106, and/or content provider 102*a* and/or 102*b*. As discussed herein, weather data may be accessible to assess and determine the weather conditions.

Figure 2:
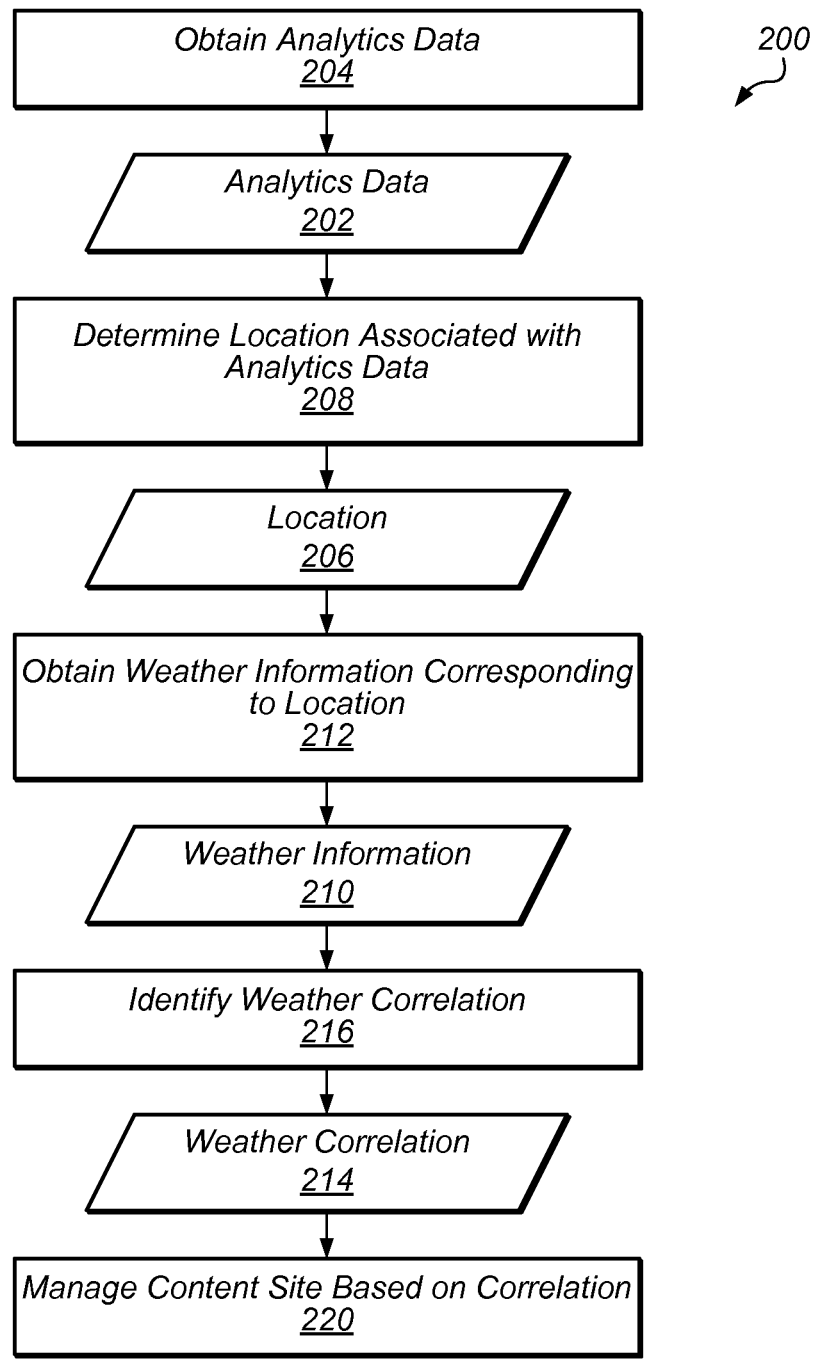
FIG. 2 is a flowchart that illustrates a method of assessing and correlating web analytics data in accordance with one or more embodiments of the present technique.

FIG. 2 is a flowchart that illustrates a method 200 of assessing and employing correlation of web analytics data in accordance with one or more embodiments of the present technique. Method 200 generally includes obtaining analytics data, determining a location associated with the analytics data, obtaining weather information corresponding to the location, identifying a weather correlation, and managing a content site based on the correlation.

Method 200 may include obtaining analytics data 202, as depicted at block 204. Analytics data may be the same or similar to analytics data 101 described with regard to system 100 of FIG. 1. In some embodiments, obtaining analytics data may include analytics provider 106 receiving analytics data 101 as described with respect to FIG. 1. For example, analytics data 202 may be embedded within a request transmitted from client device 104 to analytics provider 106.

Analytics data 202 may include activity data (e.g., activity data 101*a*) indicative of behavior/activity undertaken by one or more users. In some embodiments, activity data may be indicative of a user's interaction with a content site (e.g., website, FTP site, or other source of content accessible via an electronic network) and/or content accessed by a user via a content site. For example, activity data may include information regarding webpages visited, links selected, and/or purchases made during one or more users' navigation through a website.

Analytics data 202 may include location data (e.g., location data 101*b*) indicative of a location of a user at or near the time of the user interacting with a content site. In some embodiments, location data may be indicative of a geographic location of a user (e.g., user 109) and/or a device (e.g., client device 104) used to access the content site. Location data may include geographic coordinates (e.g., latitude and longitude coordinates), a zip code, an internet protocol (IP) address, location information acquired using a geolocation Application Programming Interface (API) (e.g., available W3C Geolocation API of Hypertext Markup Language (HTML) 5).

In some embodiments, location data may be associated with corresponding activity data. For example, analytics data 202 may include location data transmitted with or at least in association with activity data such that a location of the user at or near the time of the user engaging in the activity can be determined. For example, analytics data 202 may include a string of activity data indicative of user 109 visiting a website and a corresponding zip code. Analytics provider 106 may associate the zip code with the website visit to determine that user 109 was located within the zip code at the time of visiting the website.

In some embodiment, obtaining analytics data may include accumulating analytics data from one or more users over an extended period of time. For example, analytics data 202 may be collected from a plurality of users and/or user devices over a day, month, week year, decade, etc. to generate a corresponding analytics dataset for the time period. In some embodiments, obtaining analytics data may include receiving a raw analytics data to generate a full analytics dataset that includes analytics data for all activities being tracked. For example, a full analytics dataset may include analytics data corresponding to visits to a plurality of different websites without limitation on the type of activity and/or the location of the activity. In some embodiments, acquiring analytics data may include filtering an analytics dataset to generate a subset of analytic data. For example, where visits to a website that result in purchase of a given item (e.g., movie rentals and/or book sales) are being tracked, a full analytics dataset or data subset may be filtered to generate a relevant subset of analytics data that corresponds to visits by a plurality of users to the website that result in purchase of the given item (e.g., movie rentals and/or book sales).

Method 200 may include determining a location 206 associated with analytics data 202 obtained at block 204, as depicted at block 208. In some embodiments, determining a location may include assessing location data associated with analytics data 202 to determine a geographic location corresponding thereto. In some embodiments, the determined geographic location may include a location in a format/type that can be used to query a weather information provider for weather data corresponding to the location. For example, where a weather information provider provides weather information that corresponds to a zip code, determining a location 206 may include determining a zip code based on the location data (e.g., geographic coordinates may be translated into a zip code, a reverse look-up of an IP address may be used to identify a corresponding zip code, and so forth).

Method 200 may include obtaining weather information 210 corresponding to a location 206, as depicted at block 212. In some embodiments, obtaining weather information corresponding to a location includes providing, to a weather information provider, a query for weather data corresponding to location 206 at or near a time of corresponding analytics data. For example, upon receiving analytics data 202, analytics provider 106 may extract location data, determine location 206 based on the extracted location data, submit to weather information provider 150 a corresponding query for weather conditions at location 206, and receive corresponding weather conditions (e.g., sunny, rainy, cold, cloudy, snowy, temperature, humidity, etc.) for location 206. The corresponding weather condition may be associated with activity data corresponding to location data from which location 206 was determined.

In some embodiments, queries for weather information may be executed at or near the time of receiving analytics data. For example, analytics provider 106 may submit a query for weather information in response to receiving analytics data 202. In some embodiments, queries for weather information may be executed at some time subsequent to the time of receiving analytics data. For example, analytics provider 106 may accumulate analytics data and, at a later time (e.g., in the early morning hours when network traffic is expected to be low), submit corresponding queries for weather information associated with analytics data 202.

In some embodiments, weather information may be retrieved from stored/cached weather information. For example, weather information may be queried and received in association with a first set of analytics data corresponding to a location, the weather information may be stored/cached, and upon receiving a second set of analytics data corresponding to the same location or a similar location, weather information for the second set of analytics data may be retrieved from the stored/cached weather information (as opposed to generating a second query to weather information provider 150 for weather information corresponding to the second set of analytics data). In some embodiments, retrieving weather information for a set of analytics data from stored/cached weather information for another set of analytics data may be done when the sets of analytics data are received within a short period of time such that the weather at the location is not expected to change significantly between receiving the set of analytics data. Notably, retrieving weather information from storage/cache may reduce the number of request to weather information provider 150.

Method 200 may include identifying a weather correlation 214, as depicted at block 216. Identifying a weather correlation may include identifying patterns in user activity/behavior with respect to weather conditions at or near the location of the user's activity/behavior. For example, in some embodiments, analytics data 202 and corresponding weather information 210 is accumulated to generate web analytics activity/weather data indicative of user activity data and weather conditions corresponding thereto. The web analytics activity/weather data may provide for identifying variations/correlations in user activity/behavior based on weather conditions at the user's geographic location at the time of the user's activity. In some embodiments, for example a correlation may exists between user activity and various temperature ranges (e.g., 10-30 degrees, 31-70 degrees, 71-100 degrees, etc.), and so forth.

Figure 3A:
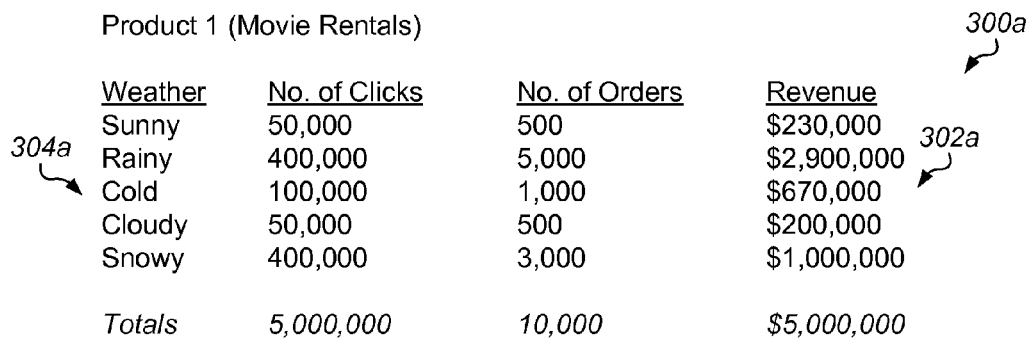
FIGS. 3A and 3B are exemplary tables that include analytics data and associated weather conditions, in accordance with one or more embodiments of the present technique.
Figure 3B:
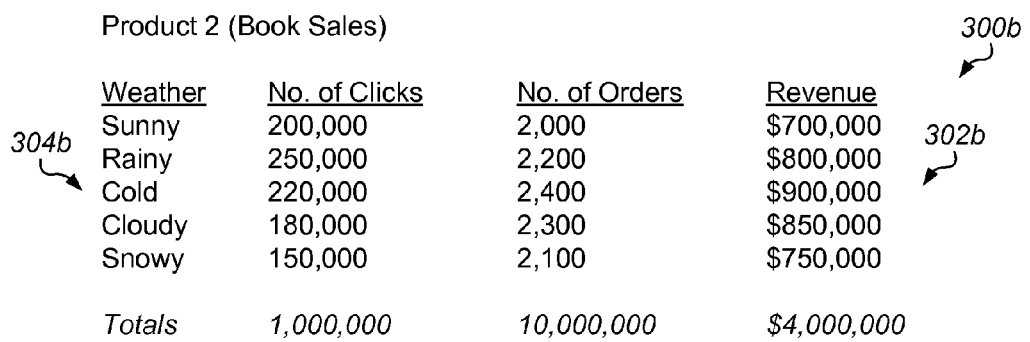

FIGS. 3A and 3B are exemplary tables 300*a* and 300*b* including analytics data and associated weather conditions, in accordance with one or more embodiments of the present technique. FIG. 3A includes web analytics activity data 302*a* for "movie rentals" in various weather conditions 304*a* (e.g., sunny, rainy, cold, cloudy, snowy). FIG. 3B includes web analytics activity data 302*b* for "book sales" in various weather conditions 304*b* (e.g., sunny, rainy, cold, cloudy, snowy). Activity data 302*a* is indicative of number of clicks (e.g., user clicks on links for move rentals), number of orders (e.g., movie rentals purchased), and revenue (e.g., resulting amount of revenue for movie rentals) for each of the specified weather conditions 304*a*. Activity data 302*b* is indicative of number of clicks (e.g., user clicks on links for books offered for sale), number of orders (e.g., books sold), and revenue (e.g., resulting amount of revenue for the books sold) for each of the specified weather conditions 304*a*.

Weather conditions may include determined weather conditions at the time of the corresponding user activity. For example, table 300*a* is indicative of 50,000 clicks, 500 orders, and $230,000 in revenue generated by users experiencing sunny weather conditions at their geographic location at the time of engaging in activity (e.g., clicks, orders, etc.) associated with "Movie Rentals". Similar data is provided for others weather conditions 304*a* of table 300*a*, as well as the activity data 302*b* and weather conditions 304*b* of table 300*b*.

Exemplary weather correlations 214 may be identified based on the information provided in tables 300*a* and/or 300*b*. Reviewing table 300*a* reveals that there are substantially more movie rentals when the users are experiencing rainy or snowy weather conditions. Moreover, table 300*a* reveals that there are substantially less movie rentals when the users are experiencing sunny or cloudy weather conditions. Such data may, thus, reveal a strong/significant correlation that rainy/snowy conditions at the user's geographic location at the time of the user's activity are more likely to result in a movie rental conversion, that sunny/cloudy conditions at the user's geographic location at the time of the user's activity are less likely to result in a movie rental conversion, and that cold conditions at the user's geographic location at the time of the user's activity may have little effect on the likelihood of a movie rental conversion.

Reviewing table 300*b* reveals that there is no substantial variation in books sales to users as a result of differing weather conditions at the users' geographic location. Such data may, thus, reveal no strong/significant correlation between weather conditions and book sale conversions.

Reviewing tables 300*a* and 300*b* together may reveal a correlation that movie rental conversions are more likely than book sale conversions when a user is experiencing rainy or snowy conditions at their geographic location, and that book sale conversions are more likely than movie rental conversions when a user is experiencing sunny, cold, or cloudy conditions at their geographic location.

Method 300 may include managing a content site based on correlations, as depicted at block 220. In some embodiments, managing a content site based on correlations may include managing a website based on weather correlations 214, such as those discussed above with regard to tables 300a and/or 300b. In some embodiments, a website may provide different content to user based on determined weather conditions at the user's location, as depicted and described in more detail below with regard to at least method 400 of FIG. 4. For example, where a website provider has identified that movie rental conversions are more likely than book sale conversions when a user is experiencing rainy or snowy conditions at their geographic location (e.g., based on weather correlation 214), upon receiving a user request for a webpage, the website provider may identify a location of the user, obtain weather information indicative of rainy conditions that are occurring or are likely to occur at the user's geographic location and, based on the correlation, provide a web page including an advertisement for a movie rental, as opposed to an advertisement for a book, for display in the webpage to the user.

In some embodiments, a website provider, and/or an entity acting on their behalf, may manage a scheme for bidding on search keywords/phrases based on determined weather within a region and/or correlations. For example, where a website provider has identified the correlation that movie rental conversions are more likely than book sale conversions when a user is experiencing rainy or snowy conditions at their geographic location at the time of the user's activity, upon identifying that the east coast is experiencing or is likely to experience rainy conditions, the website provider may increase an amount of their bids to purchase keywords/phrases including the terms "movie" and/or "rental" for searches occurring on the east coast before, during and/or after the rainy conditions. Thus, searches by users on the east cost that occur before, during and/or after the rainy conditions may be more likely to result in providing search results that drive consumers to movie rentals offered by the website.

In some embodiments, a website provider, and/or an entity acting on their behalf, may manage search results based on determined weather within a region and/or correlations. For example, where a website provider has identified the correlation that movie rental conversions are more likely than book sale conversions when a user is experiencing rainy or snowy conditions at their geographic location at the time of the user's activity, upon identifying that the east coast is experiencing or is likely to experience rainy conditions, and receiving a search request, the website provider may display results relating to movie rentals above search results relating to book sales for searches occurring on the east coast before, during and/or after the rainy conditions. Thus, searches by users on the east cost that occur before, during and/or after the rainy conditions may be more likely to result in providing search results that drive consumers to movie rentals offered by the website. Similar techniques may be used to influence what products are recommended to a user, how to present content (e.g., what article/advertisement to place at the top of a webpage), etc.

Although the above described embodiments refer to "current" weather conditions, similar correlations may be based on forecast, current and/or historic/past weather conditions.

It will be appreciated that method 300 is an exemplary embodiment of a method employed in accordance with techniques described herein. Method 300 may be may be modified to facilitate variations of its implementations and uses. The order of method 300 may be changed, and various elements may be added, reordered, combined, omitted, modified, etc. Method 300 may be implemented in software, hardware, or a combination thereof. Some or all of method 300 may be implemented by processing module 118 and/or processing module 111a and/or 11b of content providers 102a and/or 102b.

Figure 4:
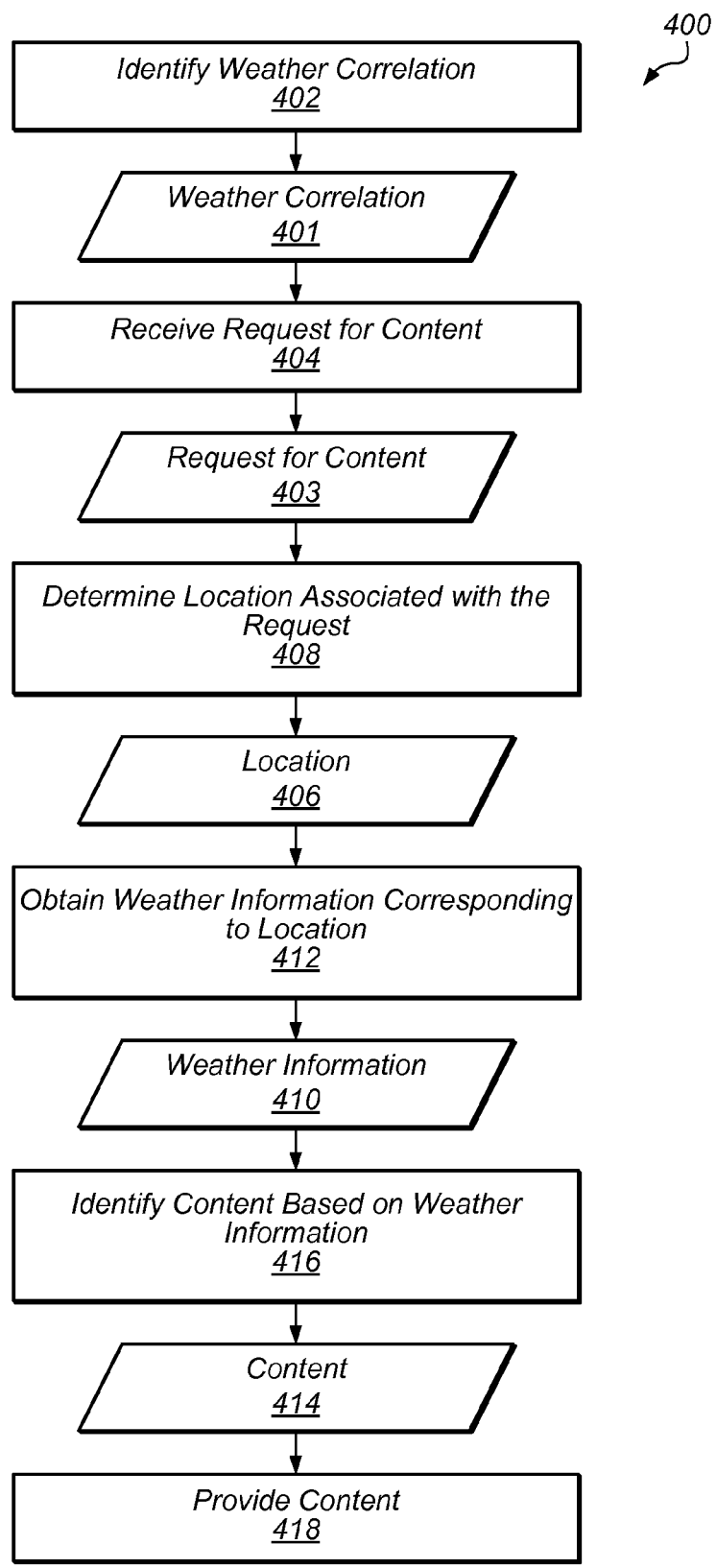
FIG. 4 is a flowchart that illustrates a method of providing content to a user based on weather conditions, in accordance with one or more embodiments of the present technique.

FIG. 4 is a flowchart that illustrates a method 400 of providing content to a user based on weather conditions (e.g., weather conditions at or near the user's geographic location), in accordance with one or more embodiments of the present technique. Method 400 generally includes identifying a weather correlation, receiving a request for content, determining a location associated with the request, obtaining weather information corresponding to the location, identifying content based on the weather information, and providing the identified content.

Method 400 may include identifying a weather correlation 401, as depicted at block 402. Identifying a weather correlation may include identifying patterns in user activity/behavior with respect to weather conditions at or near the location of the user's activity/behavior. Identifying a weather correlation 401 may be the same or similar to that of identifying a weather correlation 214, as depicted at block 216 of method 200 of FIG. 2. For example, identified weather correlations may include those described above with respect to the activity data 302b and/or 302b and weather conditions 304a and/or 304b of tables 300a and/or 300b.

In some embodiments, identification of weather correlations may be conducted at a content provider. For example, content providers 102a and/or 102b may process analytics data and/or analytics reports provided by analytics provider 106 to indentify weather correlations. In some embodiments, weather correlations may be provided to a content provider. For example, analytics provider 106 may identify and send weather correlations 401 to content provider 102a and/or 102b (e.g., via reports 140a and/or 140b).

Method 400 may include receiving a request for content 403, as depicted at block 404. In some embodiments, receiving a request for content includes receiving a request to view a website, webpage, or associated content. For example, in response to a user command at client device 104, such as clicking on a link or typing in a uniform resource locator (URL), browser application 112 may issue a webpage request 122 that is received by web content server 110a of content provider 102a via network 108 (e.g., via the Internet).

In some embodiments, request for content 403 may include location data embedded therein or otherwise associated therewith. Location data may be indicative of a location of a user at or near the time of the user providing the request. In some embodiments, location data may be indicative of a geographic location of a user (e.g., user 109) and/or a device (e.g., client device 104) used to generate the request for content 403. Location data may includes geographic coordinates (e.g., latitude and longitude coordinates), a zip code, an internet protocol (IP) address, location information acquired using a geolocation Application Programming Interface (API) (e.g., available W3C Geolocation API of Hypertext Markup Language (HTML) 5).

Method 400 may include determining a location 406 associated with the request, as depicted at block 408. Where location data is provided with the request for content 403, a location may be determined from the location data. For example, a zip code provided with request 403 may be used to directly identify the geographic location of user 109 and/or client device 104. Where sufficient location data is not provided with the request for content 403, a query for location information may be generated. For example, subsequent to receiving request 403, content provider 102a and/or 102b may query client device 104 for location information. The location information may be used to determine location 406.

In some embodiments, geographic locations may be determined based on the location data. For example, where weather information provider 150 provides weather information that corresponds to a zip code, determining a location may include determining a zip code based on the location data of analytics data 202 (e.g., geographic coordinates may be translated into a zip code, a reverse look-up of an IP address may be used to identify a corresponding zip code, and so forth).

Method 400 may include obtaining weather information 410 corresponding to location 406, as depicted at block 412. In some embodiments, obtaining weather information corresponding to a location includes providing, to a weather information provider, a query for weather data corresponding to location 406 at or near a time of receiving request 403. For example, upon receiving request 403, content provider 102a and/or 102b may receive location data, determine location 406 based on the location data, submit to weather information provider 150 a corresponding query for weather conditions at location 406, and receive the corresponding weather conditions (e.g., sunny, rainy, cold, cloudy, snowy, etc.) for location 206. The corresponding weather condition may be associated with request 403.

In some embodiments, queries for weather information may be executed substantially at the time of receiving a request. For example, content provider 102a and/or 102b may submit a query to weather information provider 150 for weather information in response to receiving request 203. In some embodiments, weather information may be retrieved from stored/cached weather information. For example, weather information may be queried and received in association with a first request corresponding to a location, the weather information may be stored/cached, and upon receiving a second request corresponding to the same or similar location, weather information for the second request may be retrieved from the stored/cached weather information (as opposed to generating a second query to weather information provider 150 for weather information corresponding to the second request). In some embodiments, retrieving weather information for a request from stored/cached weather information for another request may be done when the requests are received over a sort period of time such that the weather is not expected to change significantly between the time of the requests. Notably, retrieving weather information from storage/cache may reduce the number of request to weather information provider 150.

Method 400 may include identifying and providing content 414 based on weather information 410, as depicted at blocks 416 and 418. In some embodiments, a content provider (e.g., website) may provide different content based on determined weather conditions at the user's location at the time of generating a request for content. For example, where content providers 102a and/or 102b have identified the correlation that movie rental conversions are more likely than book sale conversions when a user is experiencing rainy or snowy conditions at their geographic location at the time of the user's activity (e.g., based on weather correlation 401), upon receiving a request for a webpage from user 109 at client device 104, content providers 102a and/or 102b may identify location 206 of user 109 and/or client device 104, obtain weather information 210 indicative of rainy conditions that are occurring or are likely to occur at the user's geographic location and, based on the correlation, provide web page 112a including an advertisement for a movie rental, as opposed to an advertisement for a book, for display to user 109 via browser application 112 of client device 104.

In some embodiments, web content may be provided based on current weather conditions at a location. For example, as described above, where content providers 102a and/or 102b have identified a correlation that sales of movie rentals increase the day of experiencing rainy or snowy conditions at a user's geographic location (e.g., based on weather correlation 401), upon receiving a request for a webpage from user 109 at client device 104, content providers 102a and/or 102b may identify location 206 of user 109 and/or client device 104, obtain current weather information 210 indicative of rainy conditions at the user's geographic location and, based on the correlation, provide web page 112a including a promotion for a movie rental, for display to user 109 via browser application 112 of client device 104.

In some embodiments, web content may be provided based on forecast/expected weather conditions at a location. For example, where content providers 102 and/or 102b have identified a correlation that user purchases of rain jackets increase during the day prior to rainy or snowy conditions at a user's geographic location (e.g., based on weather correlation 401), upon receiving a request for a webpage from user 109 at client device 104, content providers 102a and/or 102b may identify location 206 of user 109 and/or client device 104, obtain forecast weather information 210 indicative of rainy conditions for the following day at the user's geographic location and, based on the correlation, provide web page 112a including an advertisement for a rain jacket, for display to user 109 via browser application 112 of client device 104.

In some embodiments, web content may be provided based on past/historical weather conditions at a location. For example, where content providers 102 and/or 102b have identified a correlation that user purchases of toys increase in the days following rainy or snowy conditions at a user's geographic location (e.g., based on weather correlation 401), upon receiving a request for a webpage from user 109 at client device 104, content providers 102a and/or 102b may identify location 206 of user 109 and/or client device 104, obtain past/historical weather information 210 indicative of rainy conditions for the preceding day at the user's geographic location and, based on the correlation, provide web page 112a including an advertisement for a toy, for display to user 109 via browser application 112 of client device 104.

It will be appreciated that method 400 is an exemplary embodiment of a method employed in accordance with techniques described herein. Method 400 may be may be modified to facilitate variations of its implementations and uses. The order of method 400 may be changed, and various elements may be added, reordered, combined, omitted, modified, etc. Method 400 may be implemented in software, hardware, or a combination thereof. Some or all of method 400 may be implemented by processing module 118 and/or processing module 111a and/or 11b of content providers 102a and/or 102b.

Exemplary Computer System

Figure 5:
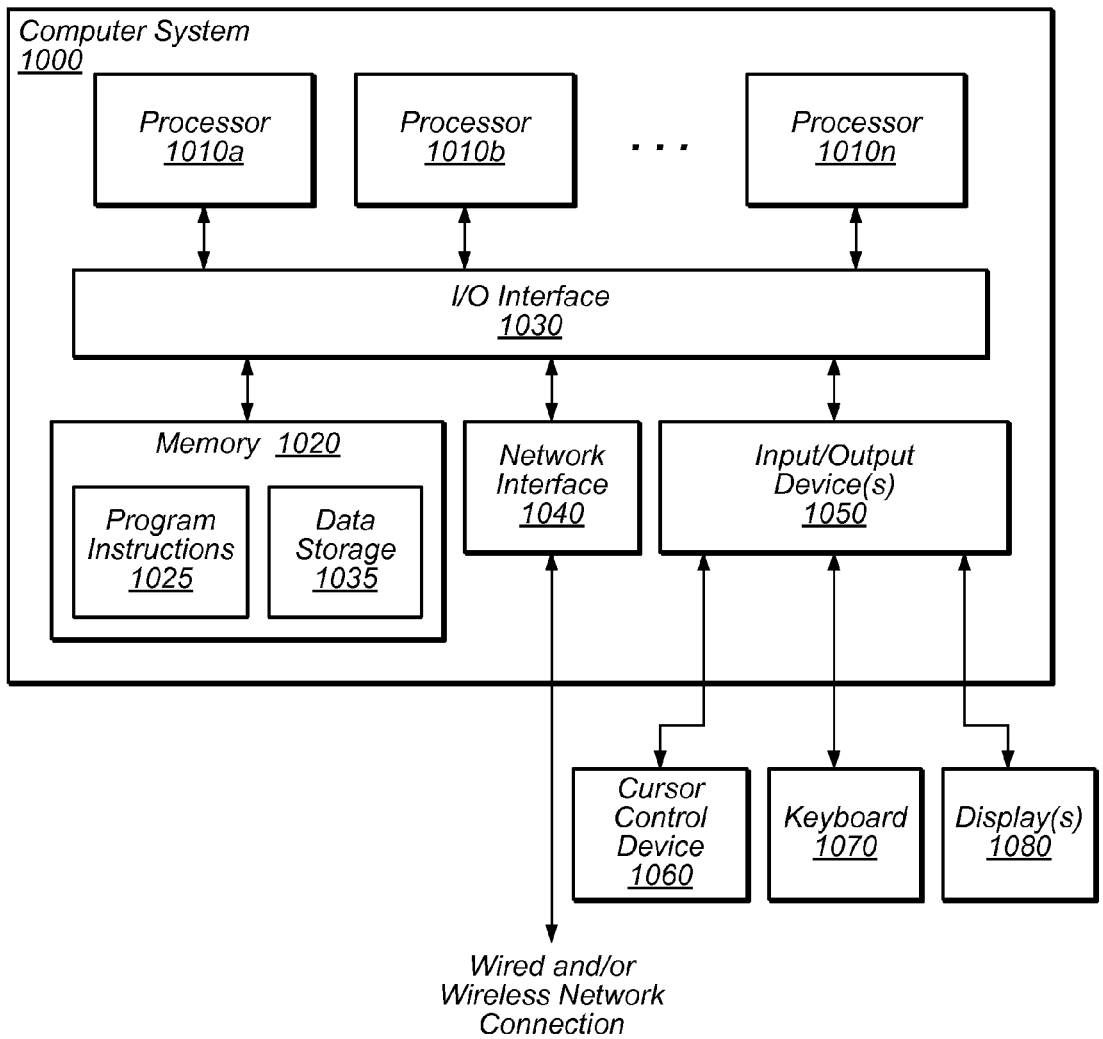
FIG. 5 is a diagram that illustrates an exemplary computer system in accordance with one or more embodiments of the present technique.

FIG. 5 is a diagram that illustrates an exemplary computer system 1000 in accordance with one or more embodiments of the present technique. Various portions of systems 100 and/or methods 200 and/or 400 may be executed on one or more computer systems similar to that described herein, which may interact with various other devices of the system. Content provider 102a and/or 102b, client device 104, web analytics provider 106 and/or weather information provider may include a computer device similar to that of computer system 1000. Web analytics processing module 118 and/or weather processing module 111*a* and/or 11*b* may be executed on a computer system of analytics provider 106 and/or content provider 102*a* and/or 102*b*.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040. Program instructions may include instructions for implementing the techniques described with respect to method 500.

In some embodiments, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a layout-preserved text generation method as described herein, and data storage 1035, comprising various data accessible by program instructions 1025. In one embodiment, program instructions 1025 may include software elements of a layout-preserved text generation method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method for providing content, comprising:
   determining a correlation between a previous weather condition and at least one previous interaction with a web site, the weather condition occurring at or near a time during which the previous sequence of pages was accessed during the website visit, wherein the correlation is indicative of the previous weather condition impacting the at least one previous interaction, wherein the at least one previous interaction comprises a previous sequence of pages accessed during a previous visit to the website;
   determining that a client computer system visiting the website has accessed a sequence of pages that is similar to the previous sequence of pages;
   obtaining weather information corresponding to a geographic location of the client computer system based on determining that the client computer system has accessed the sequence of pages similar to the previous sequence of pages, wherein the weather information describes a weather condition similar to the previous weather condition;
   identifying content to be provided from the content provider in response to request for content from the client computer system based at least in part on the weather information corresponding to the geographic location of the client computer system and based on the correlation between the previous weather condition and the at least one previous interaction; and
   providing, to the client computer system, the identified content.

2. The method of claim 1, wherein the geographic location is determined based on an internet protocol address of the client computer system.

3. The method of claim 1, wherein the geographic location comprises geographic coordinates.

4. The method of claim 1, wherein the weather information comprises at least one of forecast weather conditions and current weather conditions during an interval in which the request for content is received, and wherein the geographic location is determined at the geographic location at or near a time of the request for content.

5. The method of claim 1, wherein obtaining weather information corresponding to the geographic location of the client computer system comprises:
 sending, to a weather information provider, a request for weather data corresponding to the geographic location; and
 receiving, from the weather information provider, the weather data corresponding to the geographic location.

6. The method of claim 1, wherein obtaining weather information corresponding to the geographic location of the client computer system comprises:
 sending, to a weather information provider, a request for weather data corresponding to the geographic location;
 receiving, from the weather information provider, the weather data corresponding to the geographic location;
 storing the weather data received; and
 retrieving the weather information.

7. The method of claim 1, wherein identifying content to be provided comprises:
 determining a weather condition associated with the weather information obtained;
 identifying first content in response to determining that the weather condition indicates a first type of weather and
 identifying second content in response to determining that the weather condition indicates a second type of weather, wherein the second content is different from the first content.

8. The method of claim 1, wherein the content to be provided comprises a product advertisement.

9. The method of claim 1, further comprising:
 identifying an additional interaction between the content provider and the client computer system resulting from providing the identified content to the client computer system;
 identifying a weather type based on the weather information;
 correlating the interaction with the weather type; and
 storing an additional correlation of the additional interaction with the weather type.

10. The method of claim 9, further comprising:
 receiving an additional request for content from an additional client computer system;
 determining an additional geographic location associated with the additional client computer system;
 obtaining additional weather information corresponding to the additional geographic location;
 identifying additional content to be provided in response to the additional request for content based at least in part on the additional correlation of additional interaction between the content provider and the client computer system with the weather type; and
 providing the additional content.

11. The method of claim 1, wherein determining the correlation between the previous weather condition and the at least one previous interaction with the content provider comprises determining that the at least one previous interaction occurred during the previous weather condition, wherein the at least one previous interaction comprises a different client computer system obtaining content from the content provider.

12. The method of claim 1,
 wherein receiving the request for content to be provided by the content provider comprises receiving the request from a first user;
 wherein determining the correlation between the previous weather condition and the at least one previous interaction with the content provider comprises determining that the at least one previous interaction occurred during the previous weather condition, wherein the at least one previous interaction comprises a second user obtaining content from the content provider, wherein the second user is different from the first user.

13. A non-transitory computer readable storage medium storing computer-executable program instructions, the program instructions comprising:
 program instructions for determining a correlation between a previous weather condition and at least one previous interaction with a web site, wherein the correlation is indicative of the previous weather condition impacting the at least one previous interaction, the weather condition occurring at or near a time during which the previous sequence of pages was accessed during the website visit wherein the at least one previous interaction comprises a previous sequence of pages accessed during a previous visit to the website;
 program instructions for determining that a client computer system visiting the website has accessed a sequence of pages that is similar to the previous sequence of pages;
 program instructions for obtaining weather information corresponding to a geographic location of the client computer system based on determining that the client computer system has accessed the sequence of pages similar to the previous sequence of pages, wherein the weather information describes a weather condition similar to the previous weather condition;
 program instructions for identifying content to be provided in response to request for content from the client computer system based at least in part on the weather information corresponding to the geographic location of the client computer system and based on the correlation between the previous weather condition and the at least one previous interaction; and
 program instructions for providing the identified content to the client computer system.

14. A system comprising:
 a processor; and
 a non-transitory computer readable medium communicatively coupled to the processor, the non-transitory computer readable medium embodying a weather processing module executable by the processor to:
  determine a correlation between a previous weather condition and at least one previous interaction with a web site, wherein the correlation is indicative of the previous weather condition impacting the at least one previous interaction, the weather condition occurring at or near a time during which the previous sequence of pages was accessed during the website visit wherein the at least one previous interaction comprises a previous sequence of pages accessed during a previous visit to the website;
  determine that a client computer system visiting the website has accessed a sequence of pages that is similar to the previous sequence of pages,
  obtain weather information corresponding to a geographic location of the client computer system based on determining that the client computer system has accessed the sequence of pages similar to the previous sequence of pages, wherein the weather information describes weather condition similar to the previous weather condition;
  identify content to be provided in response to request for content from the client computer system based at least in part on the weather information corresponding to the geographic location of the client computer system and based on the correlation between the previous weather condition and the at least one previous interaction with the content provider; and provide the identified content to the client computer system.

15. A method comprising:

receiving, by an analytics server, analytics data indicative of a plurality of interactions with a content site, wherein each of the plurality of interactions comprises a respective sequence of pages accessed during a respective visit to the website;

identifying, for each interaction of the plurality of interactions with at the content site:

a respective location of a respective client computer system involved in the interaction at or near the time of the interaction; and a respective weather condition corresponding to the respective location at or near the time of the interaction;

identifying a weather correlation indicative of an impact of weather conditions on the plurality of interactions with the content site based at least in part on the plurality of interactions and corresponding weather conditions; and storing the weather correlation.

16. The method of claim 15, wherein the content site comprises a website.

17. The method of claim 15, wherein receiving analytics data indicative of the plurality of interactions comprises receiving the web analytics data embedded within a web beacon request.

18. The method of claim 15, further comprising:

receiving, from a client computer system, a request for content to be provided to a client computer system;

determining a geographic location of the client computer system;

obtaining weather information corresponding to the geographic location of the client computer system;

identifying content to be provided in response to the request for content based at least in part on the weather correlation; and providing to the client computer system the content identified in response to the request for content.

* * * * *